(12) United States Patent
Son

(10) Patent No.: US 12,325,395 B2
(45) Date of Patent: Jun. 10, 2025

(54) ELECTRIC PARKING BRAKE AND VEHICLE HAVING THE SAME

(71) Applicant: HL MANDO CORPORATION, Pyeongtaek-si (KR)

(72) Inventor: Pyeongkook Son, Seongnam-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 339 days.

(21) Appl. No.: 17/889,522

(22) Filed: Aug. 17, 2022

(65) Prior Publication Data

US 2023/0061860 A1  Mar. 2, 2023

(30) Foreign Application Priority Data

Aug. 31, 2021  (KR) .................. 10-2021-0115651

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/067* (2013.01); *F16D 51/22* (2013.01); *F16D 65/22* (2013.01);
(Continued)

(58) Field of Classification Search
CPC ........ B60T 13/746; B60T 1/067; F16D 51/22; F16D 51/24; F16D 65/22;
(Continued)

(56) References Cited

U.S. PATENT DOCUMENTS

2004/0226783 A1  11/2004  Hall et al.
2013/0154205 A1*  6/2013  Santamarina ....... B25B 23/0035
74/416
(Continued)

FOREIGN PATENT DOCUMENTS

JP         2019-505427 A    2/2019
KR   10-2013-0037875 A    4/2013
(Continued)

OTHER PUBLICATIONS

Office Action issued in corresponding Korean Patent Application No. 10-2021-0115651 dated Oct. 6, 2022.
Office Action issued in corresponding Korean Patent Application No. 10-2021-0115651, dated Jun. 10, 2022.
Office Action from Korean Patent Office Dated, Dec. 19, 2024.

*Primary Examiner* — Nicholas J Lane
(74) *Attorney, Agent, or Firm* — Harvest IP Law, LLP

(57) ABSTRACT

Disclosed herein an electric parking brake. The electric parking brake according to an embodiment of the disclosure includes a power transmission unit that receives a rotational force from an actuator that generates a driving force for implementing a parking braking force and converts the rotational force into a linear motion to press or release a pair of brake shoes disposed on both sides of an inside of a drum, respectively, wherein the power transmission unit includes a pressing piston configured to press the pair of brake shoes, a driving cylinder configured to guide the pressing piston, and a dust cover installed between the pressing piston and the driving cylinder, the dust cove formed to be deformable according to an operation of the pressing piston, wherein the dust cover is configured to maintain internal airtightness of the power transmission unit and prevent foreign substances from entering.

15 Claims, 7 Drawing Sheets

(51) Int. Cl.
  F16D 51/22 (2006.01)
  F16D 65/22 (2006.01)
  F16D 51/00 (2006.01)
  F16D 51/24 (2006.01)
  F16D 121/24 (2012.01)
  F16D 125/40 (2012.01)
  F16D 125/52 (2012.01)
(52) U.S. Cl.
  CPC ........ *F16D 2051/005* (2013.01); *F16D 51/24* (2013.01); *F16D 2121/24* (2013.01); *F16D 2125/40* (2013.01); *F16D 2125/52* (2013.01)
(58) Field of Classification Search
  CPC ........... F16D 2051/005; F16D 2121/24; F16D 2125/40; F16D 2125/52
  See application file for complete search history.

(56) References Cited

U.S. PATENT DOCUMENTS

| | | | |
|---|---|---|---|
| 2019/0128346 A1* | 5/2019 | Jung | F16D 51/24 |
| 2020/0055505 A1* | 2/2020 | Choi | B60T 13/741 |
| 2021/0253074 A1* | 8/2021 | Jo | B60T 13/741 |
| 2021/0254678 A1* | 8/2021 | Jo | F16D 65/08 |

FOREIGN PATENT DOCUMENTS

| | | |
|---|---|---|
| KR | 10-1532231 B1 | 7/2015 |
| KR | 10-2020-0041956 A | 4/2020 |
| KR | 10-2020-0099739 A | 8/2020 |
| KR | 10-2021-0031978 A | 3/2021 |
| KR | 10-2021-0063199 A | 6/2021 |
| KR | 10-2021-0104465 A | 8/2021 |

* cited by examiner

【FIG. 1】
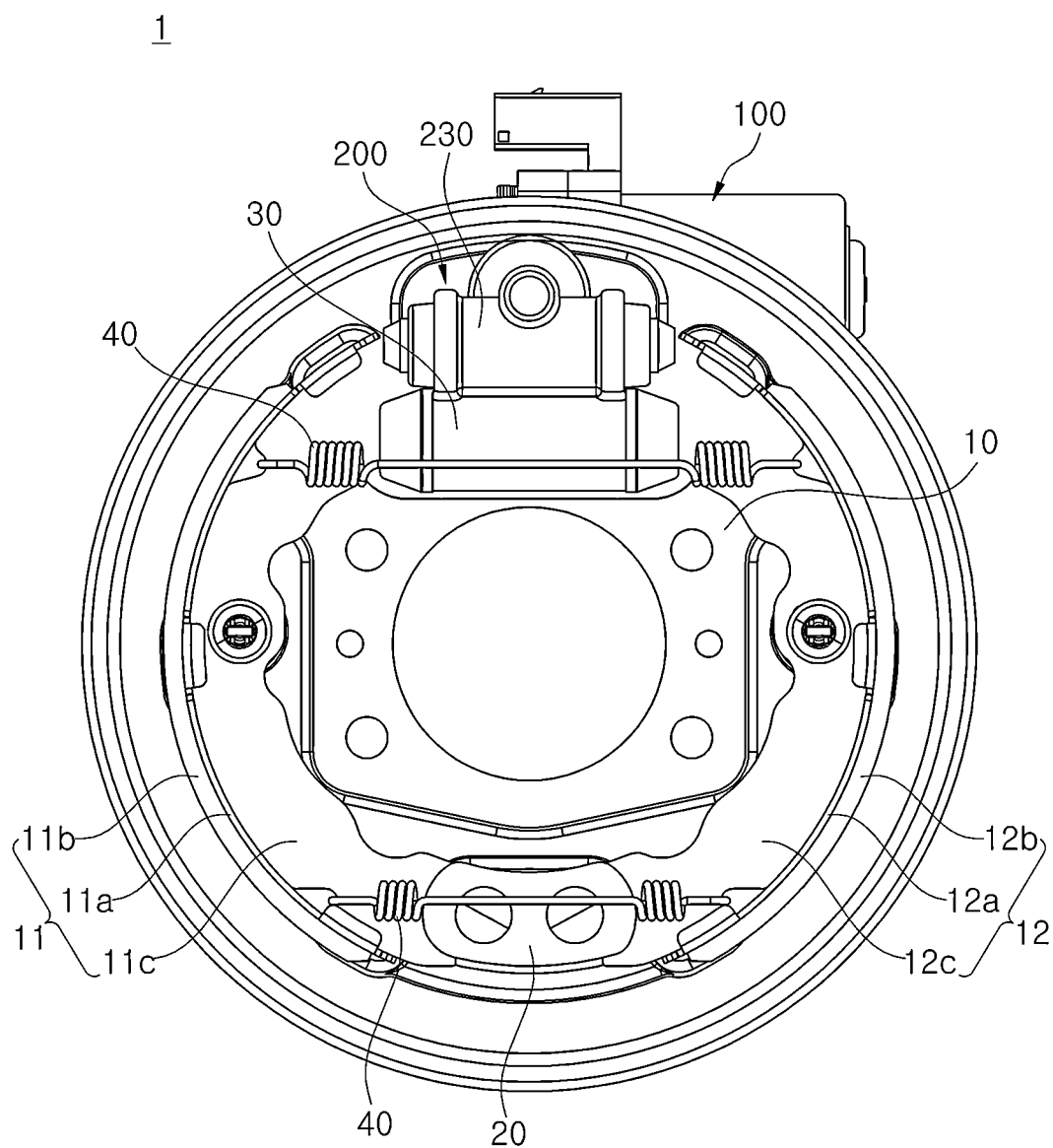

[FIG. 2]
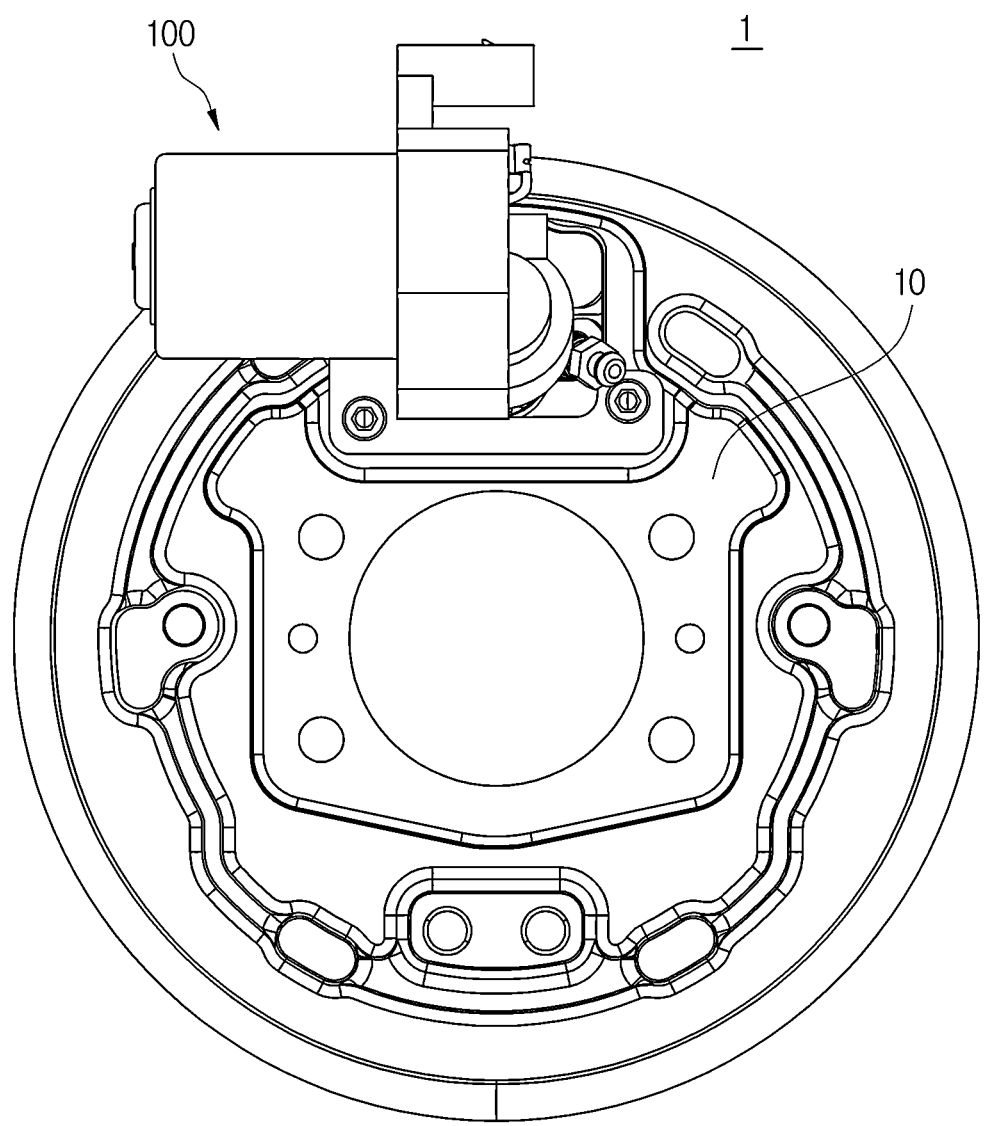

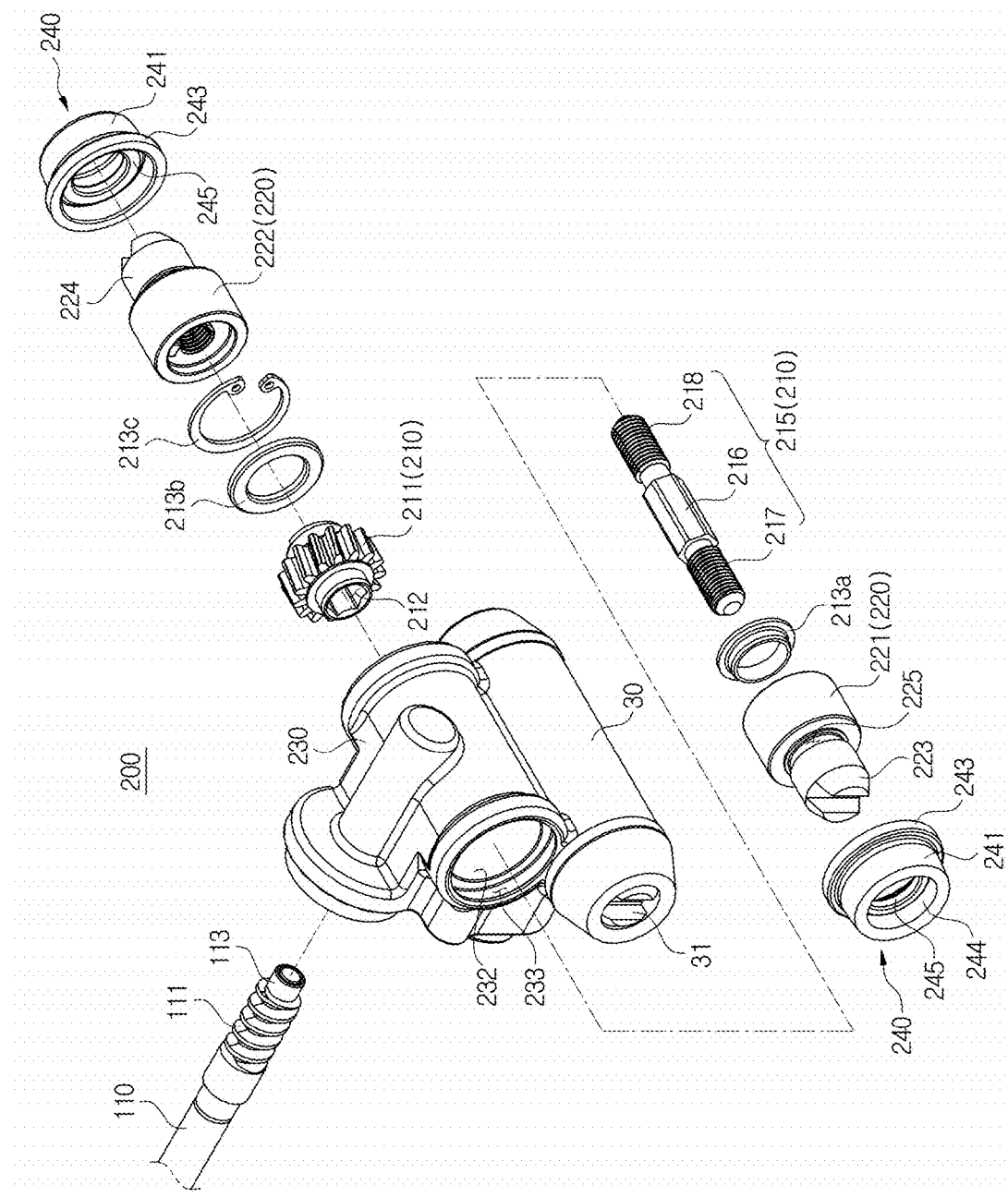
[FIG. 3]

[FIG. 4]
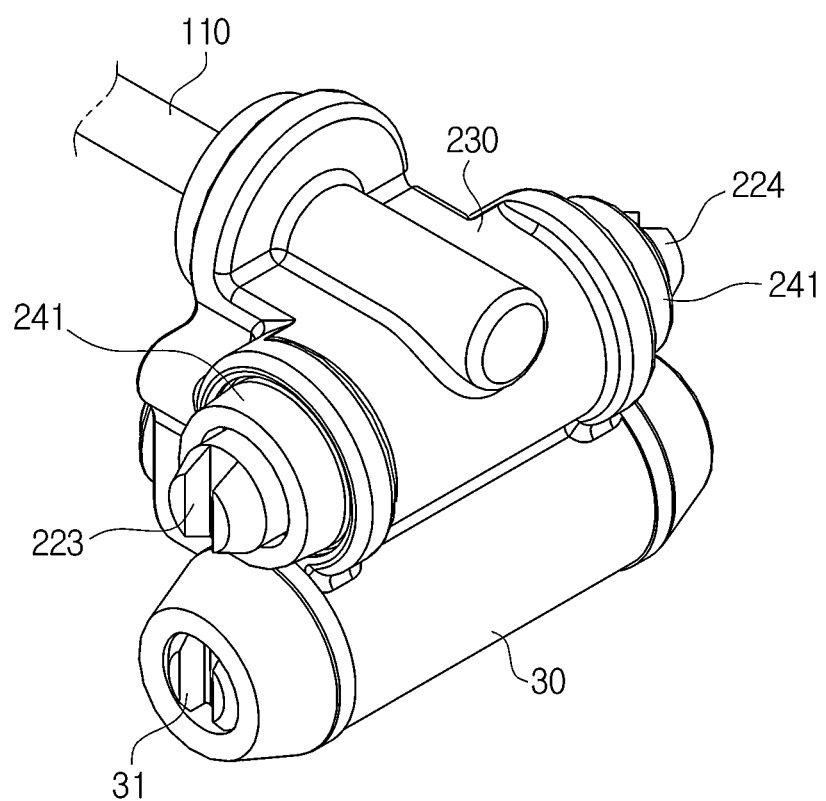

[FIG. 5]
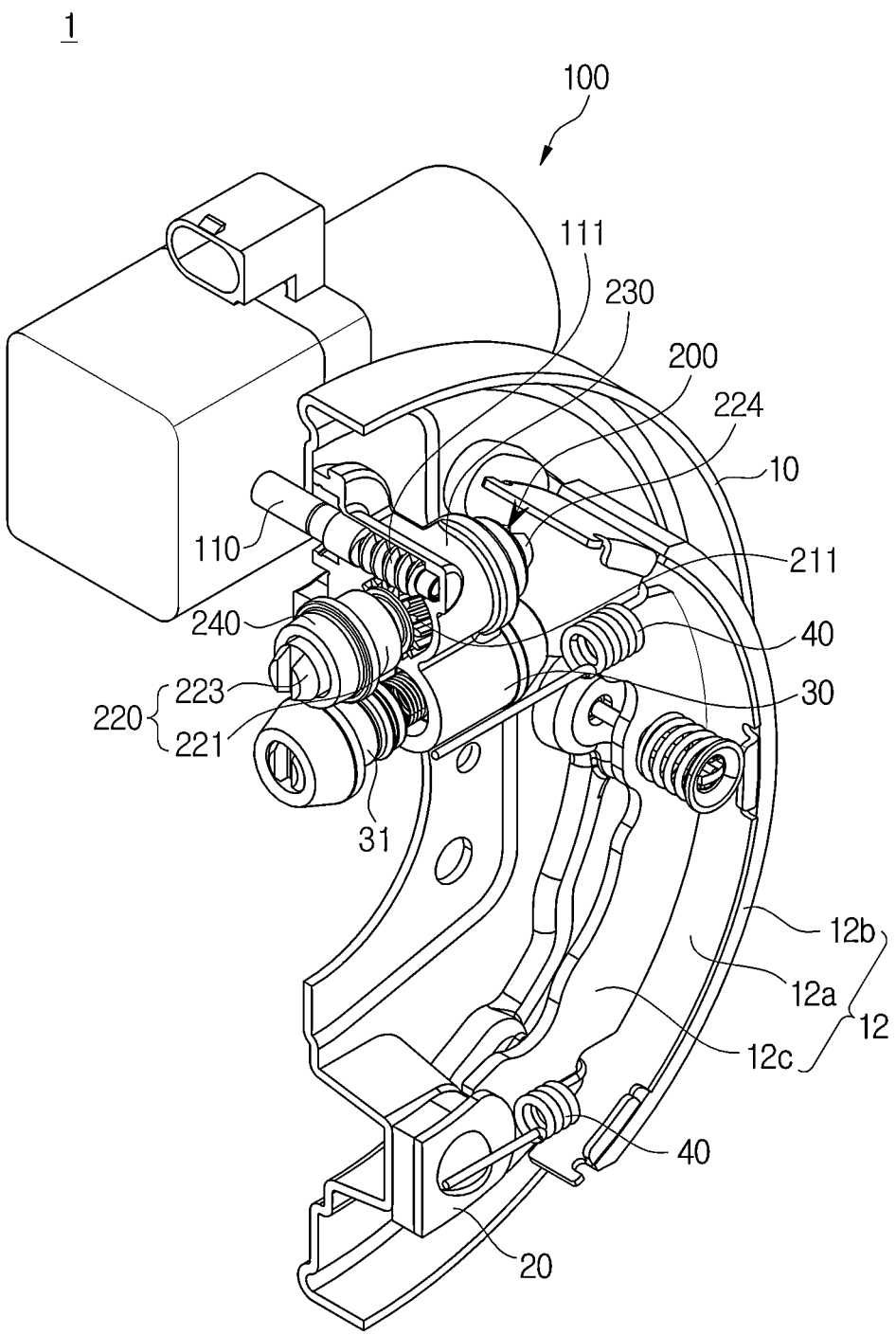

[FIG. 6]
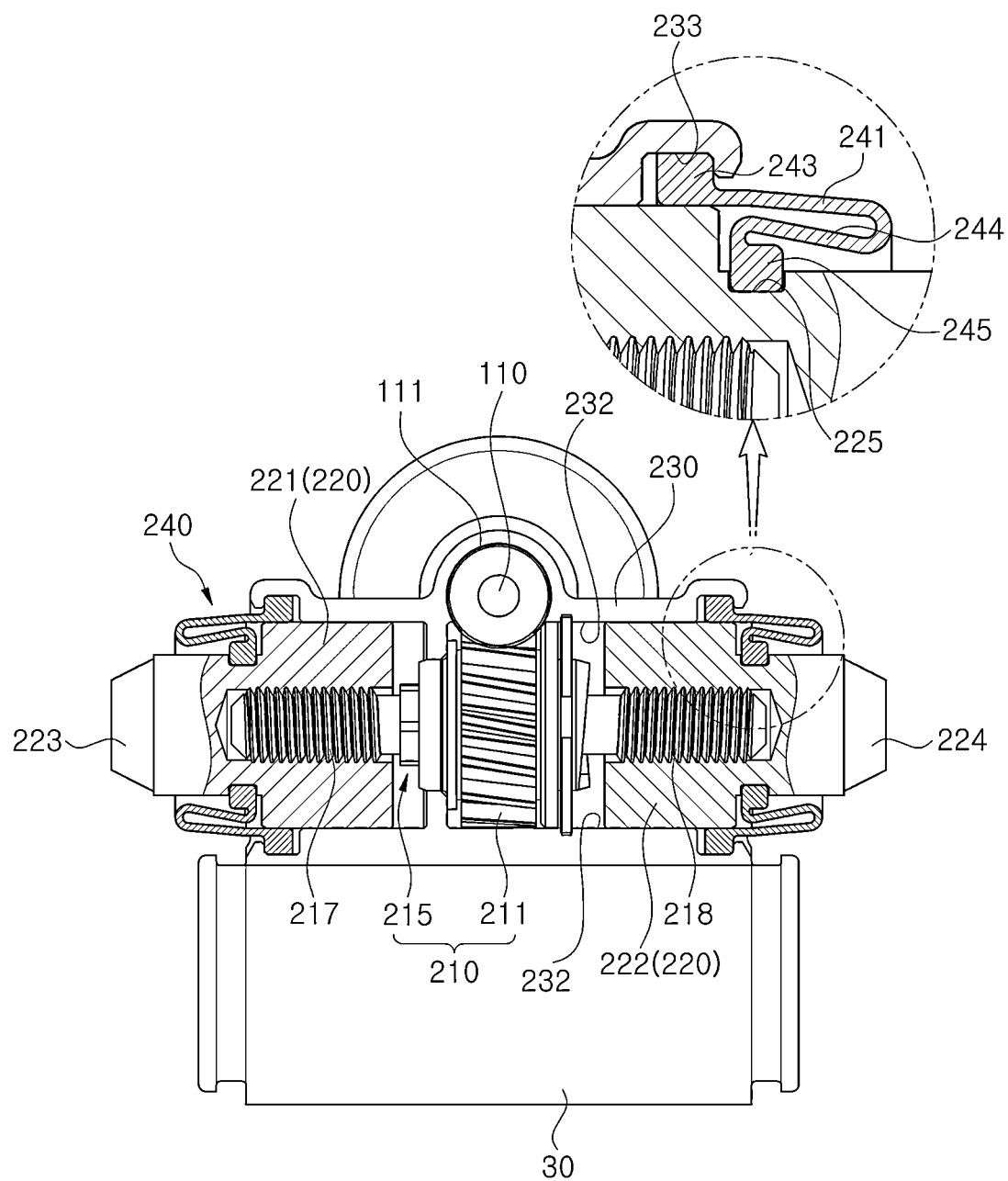

[FIG. 7]
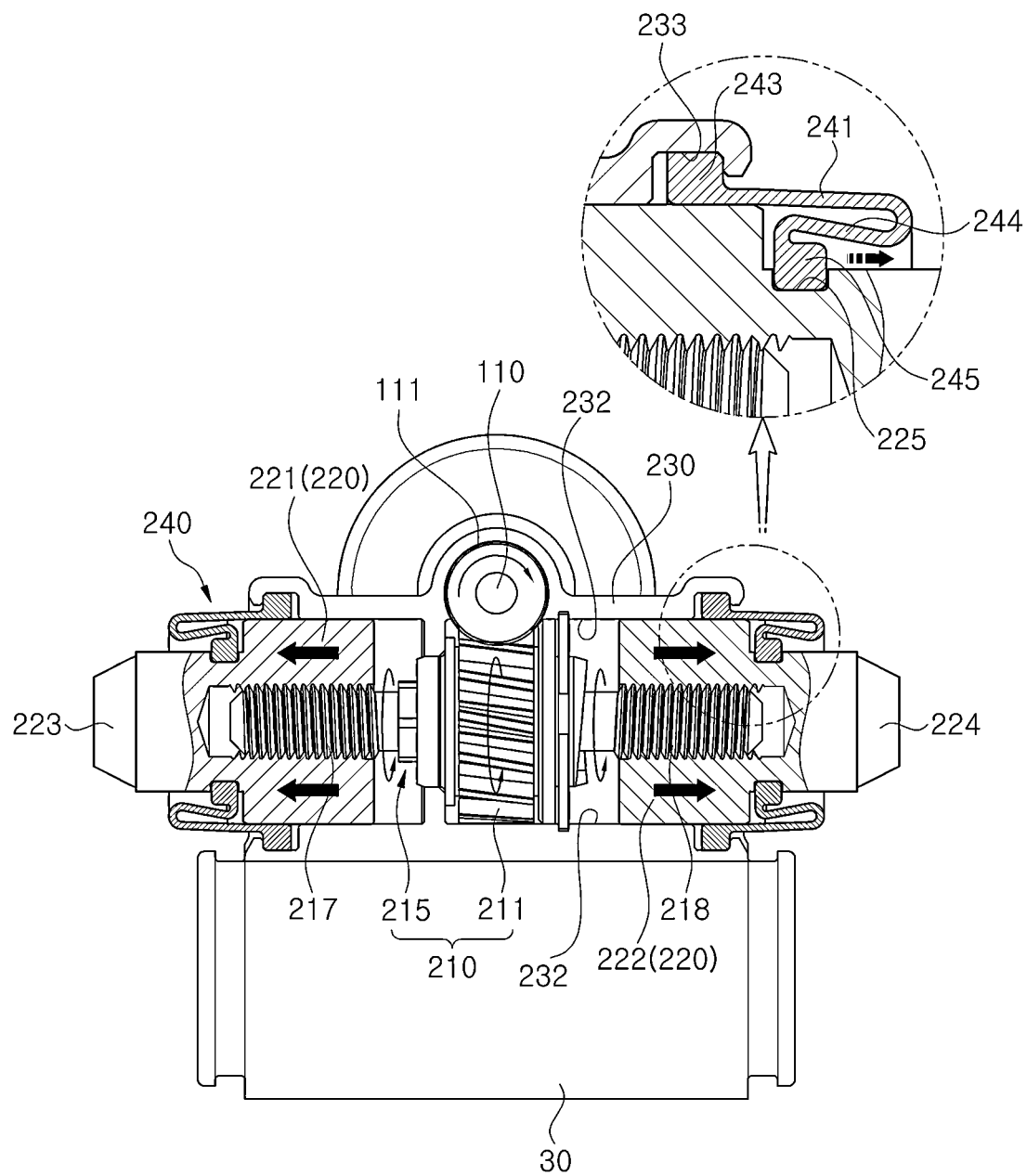

ELECTRIC PARKING BRAKE AND VEHICLE HAVING THE SAME

CROSS-REFERENCE TO RELATED APPLICATION(S)

This application is based on and claims priority under 35 U.S.C. § 119 to Korean Patent Application No. 10-2021-0115651, filed on Aug. 31, 2021 in the Korean Intellectual Property Office, the disclosure of which is incorporated herein by reference in its entirety.

TECHNICAL FIELD

The present disclosure relates to an electric parking brake, and more particularly, to an electric parking brake applied to a drum brake and operated through a motor and a gear, and a vehicle including the same.

BACKGROUND

In general, a brake mounted on a vehicle is a device that decelerates a traveling vehicle, stops, or maintains a stopped state, and converts kinetic energy during traveling into thermal energy through a mechanical friction device, thereby performing a braking operation.

Such a brake is largely divided into a drum type brake and a disc type brake, and a braking operation is performed by a braking hydraulic pressure.

Conventional drum brakes include a drum rotating together with a wheel of a vehicle, and first and second brake shoes installed inside the drum and braking the drum through friction with an inner surface of the drum. Furthermore, an operating lever is provided inside the drum to push the two brake shoes on both sides toward the inner surface of the drum when a parking cable connected to a parking lever of a driver seat is pulled. In other words, the conventional drum brakes have a structure in which the parking cable is pulled by the operation of the parking lever allow the brake shoe to be pressed, so that the brake shoes is moved in a braking direction to generate parking braking force.

However, such a manual type conventional parking brake has inconvenience in that a driver has to pull a parking lever with an appropriate force, and takes disadvantages of increasing the number of parts such as an equalizer and cable fixing device for installing a parking cable, etc., leading to increase assembly labor and further reducing utilization of an interior space of a vehicle due to the installation of a parking lever.

To solve various disadvantages of a manual type parking brake, an electric parking brake that automatically operates a brake by converting rotational force of a motor into linear motion has been proposed in recent years.

However, an electric parking brake is required for improvement because there is usability of the installation space for a driving device installed to generate parking braking force, compactness of a structure, and the like.

Furthermore, the electric parking brake used in a drum type or a disk type has a sealing member that maintains airtightness between a cylinder and a piston in order to press brake shoes or pad plates, and a boot that prevents foreign substances from entering. Accordingly, overall length of a driving device becomes longer and a cost increases due to the increase in the number of parts.

SUMMARY

An aspect of the present disclosure is to provide an electric parking brake capable of preventing an increase in cost by reducing the number of parts through improvement of a connection structure between components, and a vehicle having the same.

Further, another aspect of the present disclosure is to provide an electric parking brake capable of simplifying the structure by providing a dust cover that may simultaneously perform functions of maintaining airtightness and preventing an inflow of foreign substances, and preventing an increase in the overall length of driving device by allowing the dust cover to be used for various types of brakes, and a vehicle having the same.

Additional aspects of the present disclosure will be set forth in part in the description which follows and, in part, will be obvious from the description, or may be learned by practice of the disclosure.

In accordance with an aspect of the disclosure, an electric parking brake includes a power transmission unit that receives a rotational force from an actuator that generates a driving force for implementing a parking braking force and converts the rotational force into a linear motion to press or release a pair of brake shoes disposed on both sides of an inside of a drum, respectively, wherein the power transmission unit includes a pressing piston configured to press the pair of brake shoes, a driving cylinder configured to guide the pressing piston, and a dust cover installed between the pressing piston and the driving cylinder, the dust cove formed to be deformable according to an operation of the pressing piston, wherein the dust cover is configured to maintain internal airtightness of the power transmission unit and prevent foreign substances from entering.

The dust cover may have one end interposed between the driving cylinder and the pressing piston and the other end coupled to the pressing piston.

The power transmission unit may further include a power transmission member rotatably installed in the driving cylinder to receive the rotational force from an output gear of the actuator.

The driving cylinder may include a guide hole disposed between the pair of brake shoes and penetrating toward the pair of brake shoes.

The pressing piston may be slidably disposed on the guide hole and is screw-coupled to opposite sides of the power transmission member with respect to a center of the power transmission member.

The dust cover may further include a body part provided to surround an outer circumferential surface of the pressing piston exposed from the driving cylinder for a predetermined section, a sealing part protruding from one end of the body part in an outer radial direction to seal between an inner side of the driving cylinder and the pressing piston, and a boot part provided on the other end of the body part and fixedly coupled to the pressing piston to prevent an inflow of foreign substances into the driving cylinder.

The boot part may have a free end portion formed by bending inwardly from the other end of the body part, and the free end portion may be provided to move together according to the operation of the pressing piston.

A fixing groove may be provided in the driving cylinder so that the sealing part is inserted and fixed thereto.

An annular coupling groove may be provided in the pressing piston so that the boot part is fitted and fixed thereto.

The power transmission member may further include a rotating member configured to be rotated by meshing with the output gear, and a spindle member having a predetermined length and coupled through a center of the rotating member to rotate together with the rotating member, wherein the pressing piston is screw-coupled to opposite sides of the spindle member with respect to the rotating member.

The spindle member may further include a support shaft formed to have a polygonal shape at a center thereof, a first screw shaft formed on one side in a longitudinal direction with respect to the support shaft, and a second screw shaft formed on the other side in the longitudinal direction with respect to the support shaft, wherein threads formed on outer circumferential surfaces of the first and second screw shafts are provided to have threads in opposite directions to each other.

The center of the rotating member may be provided with a polygonal through-hole having a shape corresponding to a cross-sectional shape of the support shaft.

The pressing piston may include a first nut coupled to the first screw shaft and a second nut coupled to the second screw shaft, and the first and second nuts are provided such that opposite portions thereof coupled to the spindle member are supported by the brake shoes facing each other to restrict rotation.

The first nut may be provided with a first support portion supported by the facing brake shoe facing the first nut, the second nut may be provided with a second support portion supported by the brake shoe facing the second nut, and the first and second support portions may be provided to have a C shape so that a web of the brake shoe is partially fitted thereto.

The driving cylinder may be integrally formed with a cylinder body of a wheel cylinder that presses the pair of brake shoes by hydraulic pressure on one side.

The output gear may be provided as a worm gear, and the rotating member may be provided with a worm wheel gear meshed with the worm gear.

Opposite ends of the rotating member may be supported by a bush, a washer, and a c-clip so that the rotating member is rotated in a state in which a movement thereof is restricted within the driving cylinder.

In accordance with another aspect of the disclosure, a vehicle including an electric parking brake for implementing a parking braking force by a motor includes the electric parking brake including an actuator configured to generate a driving force for implementing the parking braking force, and a power transmission unit that receives a rotational force from the actuator and converts the rotational force into a linear motion to press or release a pair of brake shoes arranged on both sides of an inside of a drum, wherein the power transmission unit includes a pressing piston configured to press the pair of brake shoes, a driving cylinder configured to guide the pressing piston, and a dust cover installed between the pressing piston and the driving cylinder, the dust cover formed to be deformable according to an operation of the pressing piston, wherein the dust cover is configured to maintain internal airtightness of the power transmission unit and prevent an inflow of foreign substances.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a front view illustrating an electric parking brake according to an exemplary embodiment of the present disclosure;

FIG. 2 is a rear view illustrating the electric parking brake according to an exemplary embodiment of the present disclosure;

FIG. 3 is an exploded perspective view illustrating a power transmission unit provided in the electric parking brake according to an exemplary embodiment of the present disclosure;

FIG. 4 is an assembled perspective view of FIG. 3;

FIG. 5 is a partially-cut perspective view illustrating the electric parking brake according to an exemplary embodiment of the present disclosure;

FIG. 6 is a cross-sectional view illustrating a power transmission unit provided in the electric parking brake according to an exemplary embodiment of the present disclosure; and FIG. 7 is a view illustrating a state in which parking braking force is generated through the electric parking brake according to an exemplary embodiment of the present disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a front view illustrating an electric parking brake according to an exemplary embodiment of the present disclosure, FIG. 2 is a rear view illustrating an electric parking brake according to an exemplary embodiment of the present disclosure, FIG. 3 is an exploded perspective view illustrating a power transmission unit provided in an electric parking brake according to an exemplary embodiment of the present disclosure, FIG. 4 is an assembled perspective view of FIG. 3, FIG. 5 is a partially-cut perspective view illustrating an electric parking brake according to an exemplary embodiment of the present disclosure, and FIG. 6 is a cross-sectional view illustrating a power transmission unit provided in an electric parking brake according to an exemplary embodiment of the present disclosure.

Referring to FIGS. 1 to 6, an electric parking brake 1 according to an exemplary embodiment of the present disclosure includes a pair of brake shoes 11 and 12, an actuator 100 that generates and amplifies driving force for braking, and a power transmission unit 200 that receives rotational force from the actuator 100 to press or release the pair of brake shoes 11 and 12.

The pair of brake shoes 11 and 12 are mounted on a back plate 10 coupled to a knuckle part (not shown) of a vehicle body so as to be operated outwardly, and are in close contact with an inner circumferential surface of a drum to generate braking force.

The pair of brake shoes 11 and 12 are provided in an arc shape, and include a first brake shoe 11 supported by a lower anchor block 20 and arranged on a forward rotation direction side of the drum with the anchor block 20 as a center thereof and a second brake shoe 12 disposed on the opposite side.

Each of the first and second brake shoes 11 and 12 include rims 11a and 12a having a semicircular shape to which linings 11b and 12b are respectively attached, and webs 11c and 12c coupled to an inner circumferential surface of the rims 11a and 12a to support the rims 11a and 12a.

The anchor block 20 for supporting the two brake shoes 11 and 12 not to be separated during braking operation is provided between one end of the web 11c of the first brake shoe 11 and one end of the web 12c of the second brake shoe 12. In addition, a wheel cylinder 30 that operates the two brake shoes 11 and 12 outwardly so that the linings 11b and 12b are in close contact with the drum to generate braking force is provided between the other end of the web 11c of the first brake shoe 11 and the other end of the web 12c of the second brake shoe 12.

Accordingly, when a braking hydraulic pressure is transmitted to the wheel cylinder 30, the piston 31 embedded in the wheel cylinder 30 advances to the outside, and thus, the other end of the pair of brake shoes 11 and 12 is pushed outward and one end thereof rotates around the anchor block 20 to rub against the inner circumferential surface of the drum, thereby generating a braking force.

The wheel cylinder 30 may be provided integrally with a driving cylinder 230 of the power transmission unit 200 to be described later. In other words, the driving cylinder 230 of the power transmission unit 200 mechanically operated by receiving rotational force from the actuator 100 and the cylinder body of the wheel cylinder 30 operated by hydraulic pressure may be provided in a divided state so as to perform each function individually, but may be provided to have one body.

On the other hand, an undescribed reference numeral 40 refers to a return spring that allows the two brake shoes 11 and 12 to return to their original state after braking.

The actuator 100 may include a motor (not shown), a reduction gear unit (not shown) connected to the motor, and an output shaft 110 on which an output gear 111 for outputting increased torque through the reduction gear unit is formed. At this time, the reduction gear unit may be provided with a coupling structure of a plurality of gears such as a helical gear, a bevel gear, a rack-and-pinion gear, a spur gear, etc. and various gears. In an embodiment of the disclosure, the gear coupling structure of the reduction gear unit is not limited, and it should be understood that it may be used according to an optional combination.

The actuator 100 may be arranged behind the back plate 10, and the output gear 111 may be formed on the output shaft 110 protruding forward of the back plate 10. This is to improve usability of the installation space, and to transmit power to the power transmission unit 200 provided in front of the back plate 10. Herein, the actuator 100 has been illustrated and described as being coupled to the back plate 10, but it is not limited thereto, and may be coupled to a vehicle body.

On the other hand, the motor may be provided as a well-known electric motor capable of forward and reverse rotation according to a direction of the applied current flow. The motor may be connected to an electronic control unit (ECU, not shown) to be electrically controlled its operation. For example, the ECU may control various operations of the motor, such as driving and stopping, forward rotation and reverse rotation through an input signal transmitted according to a driver's instruction. When a brake operation or brake release instructions is applied by a driver, the ECU generates rotational force in a forward or reverse direction through the motor. Furthermore, the ECU may include a load sensor (not shown) for detecting magnitude of the force applied to the two brake shoes 11 and 12. Accordingly, when a force applied by receiving a signal output from the load sensor is greater than a certain level, the ECU may stop the motor.

The output gear 111 is provided to output the rotational force according to the operation of the motor through the reduction gear unit. As shown in drawings, the output gear 111 is provided on the output shaft 110 having a predetermined length, and transmits power to the power transmission unit 200 to be described later. For example, the output gear 111 may be configured as a worm gear. The worm gear 111 may be coupled to rotate together with the output shaft 110, but according to an exemplary embodiment of the present disclosure, the worm gear 111 may be formed by processing gear teeth on the other side of the output shaft 110. At this time, the output shaft 110 is provided to pass through the driving cylinder 230 and the output gear 111 is provided to be disposed between the pair of brake shoes 11 and 12 in the driving cylinder 230. Accordingly, driving force amplified from the reduction gear unit of the actuator 100 is transmitted to the power transmission unit 200 through the output gear 111.

On the other hand, an undescribed reference numeral 113 may be provided at an end of the output shaft 110 so that the output shaft 110 rotates stably, and may be provided as a bush or bearing supported by the driving cylinder 230 of the power transmission 200 to be described later.

The power transmission unit 200 serves to convert the rotational force transmitted from the output gear 111 into linear motion to press the pair of brake shoes 11 and 12 toward the inner surface of the drum. More specifically, the power transmission unit 200 may include a power transmission member 210 that is connected to the output gear 111 and rotates, a pressing piston 220 that is respectively screw-coupled to opposite sides of the power transmission member 210, a driving cylinder 230 that guides the movement of the pressing piston 220, and a dust cover 240 coupled between the driving cylinder 230 and the pressing piston 220.

The power transmission member 210 may include a rotating member 211 that is meshed with the output gear 111 to be rotated, and a spindle member 215 having a predetermined length and coupled through a center of the rotating member 211 so as to rotate together with the rotating member 211. In this case, the pressing piston 220 may be respectively screw-coupled to opposite sides of the spindle member 215 with respect to the rotating member 211.

The rotating member 211 may be provided as a worm wheel gear to be rotated by meshing with the output gear 111, that is, the worm gear 111. The rotating member 211 may be installed to be stably rotated in a state in which a movement thereof is restricted within the driving cylinder 230 by a bush 213a, a washer 213b, and a C-clip 213c.

The spindle member 215 may have a predetermined length and be disposed to pass through the rotating member 211 to be perpendicular to the output shaft 110. The spindle member 215 may be coupled to rotate together with the rotating member 211. More specifically, the spindle member 215 may include a support shaft 216 formed to have a polygonal shape at a center in a longitudinal direction, a first screw shaft 217 formed on one side in the longitudinal direction with respect to the support shaft 216, and a second screw shaft 218 formed on the other side in the longitudinal direction with respect to 216. At this time, the first and second screw shafts 217 and 218 are provided to have threads in opposite directions to each other. For example, a left-hand thread may be formed on the first screw shaft 217, and a right-hand thread may be formed on the second screw shaft 218.

A polygonal through-hole 212 having a shape corresponding to the cross-sectional shape of the support shaft 216 may be formed in the center of the rotating member 211 so that the spindle member 215 rotates together with the rotating member 211. Accordingly, the support shaft 216 is inserted into the polygonal through-hole 212 and thus the spindle member 215 rotates together with the support shaft 216 according to the rotation of the rotating member 211. In this case, the spindle member 215 may be restricted from movement in the longitudinal direction by the washer 213b and the C-clip 213c, which support the rotating member 211.

The pressing piston 220 is coupled to opposite sides of the spindle member 215 in the longitudinal direction, respectively. The pressing piston 220 serves to press the two brake shoes 11 and 12 toward the inner side of the drum according to the rotation of the power transmission member 210. The pressing piston 220 may include a first nut 221 screw-coupled with the first screw shaft 217 provided on one side of the spindle member 215, and a second nut 222 screw-coupled with the second screw shaft 218 provided on the other side of the spindle member 215.

The first nut 221 has a screw thread formed on an inner circumferential surface thereof to be screw-coupled with the spindle member 215, and a first support portion 223 is formed at an end of the opposite portion coupled to the spindle member 215. Accordingly, the first support portion 223 may be supported by the brake shoes 11 facing each other. For example, in a state in which the first nut 221 is screw-coupled with the first screw shaft 217, the first support portion 223 is supported by the web 11c of the first brake shoe 11.

The second nut 222 is threaded to be screw-coupled to the spindle member 215 on the inner circumferential surface thereof, and a second support portion 224 is formed at an end of the opposite portion coupled to the spindle member 215. Accordingly, the second support portion 224 may be supported by the brake shoes 12 facing each other. For example, in a state in which the second nut 222 is screw-coupled with the second screw shaft 218, the second support portion 224 is supported on the web 12c of the second brake shoe 12.

The first and second support portions 223 and 224 may be provided in a so-called C shape to be stably supported by the webs 11c and 12c, respectively. Accordingly, the webs 11c and 12c are inserted into the first and second support portions 223 and 224 to be stably supported. As a result, because the first and second nuts 221 and 222 are made in a state in which the rotation thereof is restricted by the webs 11c and 12c when the spindle member 215 is rotated, the first and second nuts 221 and 222 move in a straight along the longitudinal direction of the spindle member 215, thereby pressing or releasing the two brake shoes 11 and 12.

Since the first and second screw shafts 217 and 218 are threaded in opposite directions as described above, the first nut 221 and the second nut 222 move in a direction away from each other (a parking braking direction) or move in a direction closer to each other (a parking braking release direction) depending on a rotational direction of the spindle member 215.

On the other hand, an annular coupling groove 225 may be provided on the pressing piston 220 so that the dust cover 240 to be described later is fitted and fixed. The coupling groove 225 may be formed between the first nut 221 and the first support portion 223 and between the second nut 222 and the second support portion 224, respectively. A structure in which the dust cover 240 is coupled to the coupling groove 225 will be described again below.

The driving cylinder 230 may be disposed between the pair of brake shoes 11 and 12 to surround outer circumferential surfaces of the power transmission member 210 and the pressing piston 220. Furthermore, the driving cylinder 230 is fixed to the back plate 10, and serves to guide the linear motion of pressing piston 220. As described above, the driving cylinder 230 may be integrally formed with the cylinder body of the wheel cylinder 30 which is operated by hydraulic pressure and presses the two brake shoes 11 and 12. A guide hole 232 for guiding the movements of the first and second nuts 221 and 222 is formed in the driving cylinder 230. Furthermore, a fixing groove 233 is provided in the driving cylinder 230 so that the dust cover 240 to be described later is inserted and fixed. A structure in which the dust cover 240 is coupled to the fixing groove 233 will be described again below.

The guide hole 232 is formed to be pass through the pair of brake shoes 11 and 12. In other words, the guide hole 232 is formed to penetrate in the longitudinal direction of the spindle member 215. In the guide hole 232, the spindle member 215 coupled to the rotating member 211 and the first and second nuts 221 and 222 are disposed. At this time, the first and second support portions 223 and 224 of the first and second nuts 221 and 222 are exposed to the outside of the guide hole 232 to be supported by the webs 11c and 12c of the first and second brake shoes 11 and 12, respectively. Furthermore, the guide hole 232 is provided to communicate with the through hole penetrated by the output shaft 110 so that the rotating member 211 may receive the rotational force from the output gear 111.

The dust cover 240 has one end coupled to the driving cylinder 230 and the other end thereof coupled to the pressing piston 220. The dust cover 240 may include a body part 241 provided to surround the outer circumferential surface of the pressing piston 220 exposed from the guide hole 232 for a predetermined section, a sealing part 243 protruding from one end of the body part 241 in an outer radial direction, and a boot part 245 provided at the other end of the body part 241. The dust cover 240 is made of a rubber material, and the body part 241, the sealing part 243, and the boot part 245 are integrally formed.

The sealing part 243 may protrude radially outward from one end of the body part 241 to be fitted and coupled to the fixing groove 233 formed in the driving cylinder 230. Accordingly, the sealing part 243 performs a sealing function to maintain airtightness between the guide hole 232 and the pressing piston 220. In other words, because the sealing part 243 is in close contact with the outer surface of the pressing piston 220 while being fitted in the fixing groove 233, it may perform a function of maintaining airtightness even by sliding of the pressing piston 220.

The boot part 245 is formed to protrude radially inward from the other end of the body part 241, and includes a free end portion 244 formed by bending from the other end of the body part 241 so as to be located inside the body part 241. In other words, the free end portion 244 is formed to be bent inward of the body part 241 from the other end of the body part 241, and the boot part 245 is formed to protrude radially inward from the end of the free end portion 244. Accordingly, the boot part 245 is fitted and coupled to the coupling groove 225 formed in the pressing piston 220, and as the boot part 245 moves together according to the operation of the pressing piston 220, the free end portion 244 may be provided to be movable together with the pressing piston 220. As a result, even by the operation of the pressing piston 220, the boot part 245 is formed to surround between the pressing piston 220 and the driving cylinder 230, thereby preventing an inflow of foreign substances.

On the other hand, because the dust cover 240 has a double sealing structure by the sealing part 243 and the boot part 245, it is possible to more easily maintain the internal airtightness of the power transmission unit 200.

As such, the dust cover 240 may simultaneously perform functions of maintaining airtightness and preventing the inflow of foreign substances, thereby simplifying the structure and reducing costs. Furthermore, the dust cover 240 according to an exemplary embodiment of the present disclosure may be used by being adapted to a conventional drum type brake or disc type brake, thereby implementing the same effect as in the electric parking brake 1, and also having an effect of preventing an increase in the overall length.

Furthermore, the electric parking brake 1 as described above may be applied to and used in a vehicle capable of implementing a parking braking force according to the operation of the motor.

Hereinafter, a parking braking operation of the electric parking brake 1 as described above will be described with reference to FIG. 7.

First, as shown in FIGS. 1 and 6, in a state in which the two brake shoes 11 and 12 are spaced apart from the inner surface of the drum (in a state in which braking is released), when a vehicle's driver uses the ECU (not shown), for example, presses a parking switch (not shown), the motor of the actuator 100 is operated by the signal to generate a driving force. Accordingly, the output shaft 110 receiving the rotational force from the reduction gear unit (not shown) rotates, and in turn transmit the rotational force to the rotating member 211 meshed with the output gear 111 formed on the output shaft 110. At this time, as shown in FIG. 7, because the rotating member 211 and the spindle member 215 are provided to rotate together, the first and second nuts 221 and 222 of the pressing piston 220, which are screw-coupled to opposite sides of the spindle member 215, respectively, move linearly to press the two brake shoes 11 and 12 toward the inner surface of the drum, thereby performing a parking braking.

Meanwhile, in the dust cover 240, the sealing part 243 is fixed to the driving cylinder 230 and the boot part 245 is coupled to the pressing piston 220, so the boot part 245 moves together when the pressing member 220 moves linearly. At this time, because the sealing part 243 maintains a state in close contact with the pressing piston 220 while being fixed to the driving cylinder 230, even if the pressing piston 220 is operated, airtightness between the driving cylinder 230 and the pressing piston 220 may be maintained. Furthermore, the free end portion 244 is elastically deformed together with the movement of the boot part 245, thereby preventing foreign substances from entering between the pressing piston 220 and the driving cylinder 230.

When the parking braking force of the electric parking brake 1 is released, it may be implemented by controlling the motor of the actuator 100 to generate the driving force in a reverse direction during braking. In other words, the rotational force is transmitted in the same way as in the case of the parking braking, but by rotating in the opposite direction, the first and second nuts 221 and 222 move to their original positions, thereby releasing the parking braking force.

As is apparent from the above, the electric parking brake of various embodiments of the present disclosure may prevent an increase in cost by reducing the number of parts through improvement of a connection structure between components, and a vehicle having the same.

Further, the electric parking brake of various embodiments of the present disclosure may improve efficiency of the installation space by enabling compactness according to the improvement of the power transmission connection structure.

Further, the electric parking brake of various embodiments of the present disclosure may simplify a structure by providing the dust cover that may simultaneously perform functions of maintaining airtightness and preventing an inflow of foreign substances, and prevent an increase in the overall length of driving device by allowing the dust cover to be used for various types of brakes, and a vehicle having the same.

As described above, the exemplary embodiments of the disclosure have thus far been described with reference to accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An electric parking brake, comprising:
a power transmission unit that receives a rotational force from an actuator that generates a driving force for implementing a parking braking force and converts the rotational force into a linear motion to press or release a pair of brake shoes disposed on both sides of an inside of a drum, respectively,
wherein the power transmission unit comprises:
a pair of pressing pistons configured to press the pair of brake shoes;
a driving cylinder configured to guide the pair of pressing pistons; and
a pair of dust covers, each installed between a respective one of the pair of pressing pistons and the driving cylinder, and each formed to be deformable according to an operation of the respective one of the pair of pressing pistons; and
wherein each of the pair of dust covers is configured to maintain internal airtightness of the power transmission unit and prevent foreign substances from entering, and
wherein the power transmission unit further comprises a power transmission member rotatably installed in the driving cylinder to receive the rotational force from an output gear of the actuator, and
wherein the power transmission member further comprises:
a rotating member configured to be rotated by meshing with the output gear; and
a spindle member having a predetermined length and coupled through a center of the rotating member to rotate together with the rotating member, and
wherein the pair of pressing pistons are screw-coupled to opposite sides of the spindle member with respect to the rotating member, and
wherein one of opposite ends of the rotating member is supported by a bush and the other of the opposite ends of the rotating member is supported by a washer and a c-clip so that the rotating member is rotated in a state in which a movement thereof is restricted within the driving cylinder.

2. The electric parking brake of claim 1, wherein each of the pair of dust covers has one end interposed between the driving cylinder and the respective one of the pair of pressing pistons and the other end coupled to the respective one of the pair of pressing pistons.

3. The electric parking brake of claim 1, wherein the driving cylinder includes a guide hole disposed between the pair of brake shoes and penetrating toward the pair of brake shoes.

4. The electric parking brake of claim 3, wherein the pair of pressing pistons are slidably disposed on the guide hole and are screw-coupled to opposite sides of the power transmission member with respect to a center of the power transmission member.

5. The electric parking brake of claim 1, wherein each of the pair of dust covers further comprises:
- a body part provided to surround an outer circumferential surface of the respective one of the pair of pressing pistons exposed from the driving cylinder for a predetermined section,
- a sealing part protruding from one end of the body part in an outer radial direction to seal between an inner side of the driving cylinder and the respective one of the pair of pressing pistons, and
- a boot part provided on the other end of the body part and fixedly coupled to the respective one of the pair of pressing pistons to prevent an inflow of foreign substances into the driving cylinder.

6. The electric parking brake of claim 5, wherein the boot part has a free end portion formed by bending inwardly from the other end of the body part, and
- the free end portion is provided to move together according to the operation of the respective one of the pair of pressing pistons.

7. The electric parking brake of claim 5, wherein a fixing groove is provided in the driving cylinder so that the sealing part is inserted and fixed thereto.

8. The electric parking brake of claim 5, wherein an annular coupling groove is provided in the respective one of the pair of pressing pistons so that the boot part is fitted and fixed thereto.

9. The electric parking brake of claim 1, wherein the spindle member further comprises:
- a support shaft formed to have a polygonal shape at a center thereof,
- a first screw shaft formed on one side in a longitudinal direction with respect to the support shaft, and
- a second screw shaft formed on the other side in the longitudinal direction with respect to the support shaft;
- wherein threads formed on outer circumferential surfaces of the first and second screw shafts are provided to have threads in opposite directions to each other.

10. The electric parking brake of claim 9, wherein the center of the rotating member is provided with a polygonal through-hole having a shape corresponding to a cross-sectional shape of the support shaft.

11. The electric parking brake of claim 9, wherein the pair of pressing pistons includes a first nut coupled to the first screw shaft and a second nut coupled to the second screw shaft, and
- the first and second nuts are provided such that opposite portions thereof coupled to the spindle member are supported by the brake shoes facing each other to restrict rotation.

12. The electric parking brake of claim 11, wherein
- the first nut is provided with a first support portion supported by the facing brake shoe facing the first nut,
- the second nut is provided with a second support portion supported by the brake shoe facing the second nut, and
- the first and second support portions are provided to have a C shape so that a web of the brake shoe is partially fitted thereto.

13. The electric parking brake of claim 1, wherein the driving cylinder is integrally formed with a cylinder body of a wheel cylinder that presses the pair of brake shoes by hydraulic pressure on one side.

14. The electric parking brake of claim 1, wherein the output gear is provided as a worm gear, and
- the rotating member is provided with a worm wheel gear meshed with the worm gear.

15. A vehicle including an electric parking brake, the vehicle comprising:
- the electric parking brake comprising:
- an actuator configured to generate a driving force for implementing the parking braking force; and
- a power transmission unit that receives a rotational force from the actuator and converts the rotational force into a linear motion to press or release a pair of brake shoes arranged on both sides of an inside of a drum,
- wherein the power transmission unit comprises:
- a pair of pressing pistons configured to press the pair of brake shoes;
- a driving cylinder configured to guide the pair of pressing pistons; and
- a pair of dust covers, each installed between a respective one of the pair of pressing pistons and the driving cylinder, and each formed to be deformable according to an operation of the respective one of the pair of pressing pistons;
- wherein each of the pair of dust covers is configured to maintain internal airtightness of the power transmission unit and prevent an inflow of foreign substances from entering, and
- wherein the power transmission unit further comprises a power transmission member rotatably installed in the driving cylinder to receive rotational force from an output gear of the actuator, and
- wherein the power transmission member further comprises:
- a rotating member configured to be rotated by meshing with the output gear; and
- a spindle member having a predetermined length and coupled through a center of the rotating member to rotate together with the rotating member, and
- wherein the pair of pressing pistons are screw-coupled to opposite are sides of the spindle member with respect to the rotating member, and
- wherein one of opposite ends of the rotating member is supported by a bush and the other of the opposite ends of the rotating member is supported by a washer and a c-clip so that the rotating member is rotated in a state in which a movement thereof is restricted within the driving cylinder.

* * * * *